United States Patent
Fritz et al.

(10) Patent No.: US 8,671,978 B2
(45) Date of Patent: Mar. 18, 2014

(54) REFUELING DEVICE AND MOTOR VEHICLE HAVING SUCH A REFUELING DEVICE

(75) Inventors: Michael Fritz, Wurmberg (DE); Josef Oesterle, Muehlacker (DE); Horst Petri, Weil Der Stadt (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 127 days.

(21) Appl. No.: 13/192,579

(22) Filed: Jul. 28, 2011

(65) Prior Publication Data

US 2012/0024849 A1 Feb. 2, 2012

(30) Foreign Application Priority Data

Jul. 29, 2010 (DE) .................. 10 2010 036 739

(51) Int. Cl.
| | | |
|---|---|---|
| B65B 3/12 | (2006.01) | |
| B67C 3/02 | (2006.01) | |
| F02M 5/10 | (2006.01) | |
| F16K 24/04 | (2006.01) | |
| B65B 1/48 | (2006.01) | |
| B65B 3/18 | (2006.01) | |

(52) U.S. Cl.
USPC ...... 137/565.17; 137/575; 137/587; 123/518; 220/86.2; 141/67; 141/95; 141/198

(58) Field of Classification Search
USPC .............. 137/43, 430, 202, 587, 571, 565.17, 137/575; 123/518; 220/86.1, 86.2; 141/67, 141/95, 198
See application file for complete search history.

(56) References Cited

U.S. PATENT DOCUMENTS

| | | | | |
|---|---|---|---|---|
| 5,829,619 | A | * 11/1998 | Gupta et al. | 220/86.2 |
| 5,860,458 | A | 1/1999 | Benjey et al. | |
| 6,698,475 | B2 | 3/2004 | Schaefer et al. | |
| 2005/0279406 | A1 | * 12/2005 | Atwood et al. | 137/39 |

FOREIGN PATENT DOCUMENTS

| | | | |
|---|---|---|---|
| DE | 19712963 | 10/1998 | |
| DE | 10 2004 011 119 | 9/2005 | |
| JP | 10-61512 | 3/1998 | |
| JP | 10061512 A | * 3/1998 | ............. F02M 37/00 |

* cited by examiner

Primary Examiner — Craig Schneider
Assistant Examiner — Atif Chaudry
(74) Attorney, Agent, or Firm — Gerald E. Hespos; Michael J. Porco; Matthew T. Hespos

(57) ABSTRACT

A refueling device (1) for refueling a fuel tank (2) of an internal combustion engine (3) in a motor vehicle (4) has a filler connector (5) for feeding fuel to the fuel tank (2). An integrated fuel feed device (10) feeds the fuel from the filler connector (5) to the fuel tank (2).

9 Claims, 1 Drawing Sheet

REFUELING DEVICE AND MOTOR VEHICLE HAVING SUCH A REFUELING DEVICE

CROSS REFERENCE TO RELATED APPLICATION

This application claims priority under 35 USC 119 to German Patent Application No. 10 2010 036 739.7 filed on Jul. 29, 2010, the entire disclosure of which is incorporated herein by reference.

BACKGROUND OF THE INVENTION

1. Field of the Invention

The invention relates to a refueling device for refueling a fuel tank of an internal combustion engine. The invention also relates to a motor vehicle having such a refueling device. The invention can be applied to any vehicle, but will be explained in detail with reference to a passenger car 2. Description of the Related Art A motor vehicle typically has a fuel container to carry fuel to operate an internal combustion engine. A refueling device is arranged on and connected to the fuel tank and functions to fill the fuel tank with fuel. The fuel is fed to the internal combustion engine of the motor vehicle via a fuel line. A venting device usually is provided on the fuel tank to vent the fuel tank if an excessively high gas pressure occurs therein. The gas pressure rises, for example, when the volatile components of the fuel go into the gas phase. This venting device often is equipped with a pressure holding valve that opens at a specific gas pressure and closes again automatically at a specific gas pressure. The venting device also has a filter, such as an activated carbon filter, for cleaning the exhaust air that is discharged from the fuel tank. The filter device and the pressure holding valve cause the venting device to have certain flow resistance, which makes reliable reduction of pressure in the fuel tank more difficult. This is disadvantageous during a refueling process since fuel can accumulate in a filler connector of the fuel tank.

DE 10 2004 011 119 A1 describes a fuel tank with a venting device with an equalization volume. The venting device is in the interior of the fuel tank and has at least two venting points for discharging fuel vapors. The venting points each connect to a venting section and have a venting opening. A pressure holding valve with a predefined opening pressure is downstream of the venting opening. The venting point of the first venting point is geodetically higher and the associated pressure holding valve has a larger opening pressure value than the opening pressure value of the pressure holding valves of the further venting points. The further venting points have a float valve upstream of their pressure holding valve, but the first venting point has not float valve. However, this arrangement has proven to be disadvantageous, if the internal pressure in the fuel tank is not reduced quickly enough due to the large resistance of the venting device. Fuel nevertheless can accumulate in the filler connector, and hence a fuel nozzle located in the filler connector switches off and a refueling process therefore is interrupted.

The invention is based on the object of making available an improved refueling device which overcomes the abovementioned disadvantages.

SUMMARY OF THE INVENTION

The invention relates to a refueling device for refueling a fuel tank of an internal combustion engine of a motor vehicle. The refueling device has a filler connector for feeding fuel to the fuel tank; and an integrated fuel feed device for feeding the fuel from the filler connector to the fuel tank.

The invention also relates to a motor vehicle having such a refueling device.

The invention provide an integrated fuel feed device that actively feeds fuel from the filler connector into the fuel tank. The fuel feed device therefore reliably feeds the fuel into the fuel tank counter to an overpressure in the fuel tank. A quicker and cleaner refueling process of the fuel tank therefore advantageously is possible without fuel accumulating in the filler connector.

The refueling device includes the fuel tank to ensure an integral and therefore cost-effective design of the refueling device.

The fuel feed device preferably is integrated into the filler connector and hence into the refueling device for a very economical use of installation space.

The filler connector preferably has essentially the cross-sectional shape of a hollow cylinder and the fuel feed device is arranged approximately centrally in the cross section of the filler connector so that fuel can flow past the fuel feed device in a uniform fashion.

The fuel feed device preferably is integrated into the fuel tank to achieve a very space-saving integration of the fuel feed device.

A feed capacity of the fuel feed device preferably is higher than a feed capacity of a fuel nozzle. Thus, fuel reliably is prevented from accumulating in the filler connector.

The refueling device preferably has a switching device for switching the fuel feed device on or off, which avoids continuous operation of the fuel feed device. This reduces the energy requirement for operating the fuel feed device.

The switching device preferably is designed to detect first and second operating states of the refueling device. A fuel nozzle is held at least in certain sections in a filler section of the filler connector in the first operating state and is removed from the filler section of the filler connector in the second operating state. Thus the switching device reliably detects whether a refueling process is currently taking place or whether the process has already ended.

The switching device preferably switches on the fuel feed device only when the fuel nozzle is held at least in certain sections by the filler section of the filler connector. As a result, the fuel feed device is operated only when a refueling process is taking place, thereby advantageously reducing the energy requirement of the fuel feed device.

The switching device preferably has a sensor for determining a fuel tank internal pressure and the switching device is embodied to switch on the fuel feed device only when the fuel tank internal pressure determined by the sensor is above a predetermined pressure threshold value. This permits a further reduction in the energy requirement of the fuel feed device since the latter is switched on only starting from a predetermined pressure threshold value.

The fuel feed device preferably is an electric fuel pump, such as a flow pump or a displacement pump to ensure a reliable operation of the fuel feed device.

The fuel tank and the filler connector preferably are in one piece to permit particularly simple and cost-effective manufacture of the refueling device.

The fuel tank preferably has a venting device for reducing an overpressure in the fuel tank, thereby making the refueling process easier and reliably reducing the overpressure after the refueling process.

The fuel tank preferably has a filling level limiting device, such as a filling level limiting valve that closes off the venting device of a fuel tank that is filled completely with fuel. This reliably prevents fuel from penetrating and damaging the venting device, and prevents fuel from entering the surroundings.

The invention will be explained in more detail below on the basis of exemplary embodiments and with reference to the appended schematic figures of the drawing.

DETAILED DESCRIPTION OF THE PREFERRED EMBODIMENTS

Figure 1:
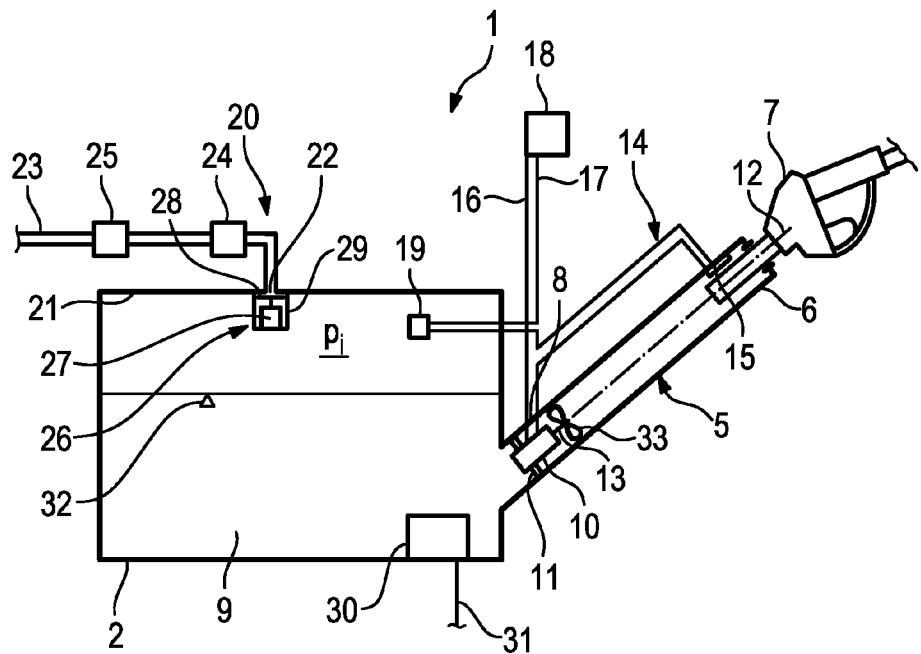
FIG. 1 is a schematic illustration of a refueling device according to the invention.

FIG. 1 illustrates a preferred embodiment of a refueling device 1 for refueling a fuel tank 2 of an internal combustion engine of a motor vehicle. The refueling device 1 has a filler connector 5 for feeding fuel to the fuel tank 2. The filler connector 5 preferably has the cross-sectional shape of a hollow cylinder. The filler connector 5 also has a first end 6 that defines a filler section for holding a fuel nozzle 7 and a second end 8 that defines a connection between the filler connector 5 and the fuel tank 2.

The refueling device 1 also has the fuel tank 2 that may be a right-parallelepiped-shaped geometry with an interior space 9 for holding the fuel. An external geometry of the fuel tank 2 preferably is adapted to an existing installation space in the motor vehicle. The fuel tank 2 therefore can have a complex three-dimensional geometry. The filler connector 5 and the fuel tank 2 preferably are embodied in one piece and may be formed, for example, from plastic or metal.

The refueling device 1 has, for example, an integrated fuel feed device 10 for feeding fuel from the filler connector 5 to the fuel tank 2. A feed capacity of the fuel feed device 10 exceeds a feed capacity of the fuel nozzle 7. The fuel feed device 10 preferably is an electric fuel pump 10, such a flow pump 10 or a displacement pump 10. In a preferred embodiment of the refueling device 1, the fuel feed device 10 is integrated into the filler connector 5 and is arranged approximately centrally in a cross section of the filler connector 5. The fuel feed device 10 preferably is provided in the region of the connecting section 8. The refueling device 1 preferably has a fuel feed device receptacle 11 that may be an integral component of the filler connector 5 and that is configured for holding the fuel feed device 10. The central axis 12 of the filler connector 5 preferably is parallel to or collinear with a drive axis 13 of the fuel feed device 10. The fuel feed device 10 preferably is arranged so that fuel flows around the fuel feed device 10 on all sides and, if appropriate through the fuel feed device 10. The drive axis 13 caries a fuel feed means 33 such as an impeller wheel 33 for feeding the fuel. In a further preferred embodiment of the refueling device 1 the fuel feed device 10 is integrated into the fuel tank 2.

The refueling device 1 preferably has a switching device 14 for switching the fuel feed device 10 on or off. The switching device 14 has, for example, a switch 15 arranged in the region of the filler section 6 of the filler connector 5. The switch 15 changes its switch to state if the fuel nozzle 7 is received at least in certain sections by the filler section 6, and changes its switch to state again if the fuel nozzle 7 is removed from the filler section 6. The switching device 14 also has two electric lines 16, 17 for electrically connecting the fuel feed device to a power source 18. The electric line 16 is a ground line 16 connected to a negative pole of the power source 18. The power source 18 may be a starter battery 18 of the motor vehicle. The switch 15 is designed here for connecting or disconnecting one of the two electric lines 16, 17, in particular the line 17, if the fuel nozzle 7 is received at least in certain sections by the filler section 6 or is removed therefrom. The switching device 14 therefore is designed to detect a first operating state of the refueling device 1, in which the fuel nozzle is held at least in certain sections in the filer section 6 of the filler connector 5, and a second operating state of the refueling device 1, in which the fuel nozzle 7 is removed from the filler section 6 of the filler connector 5. The switching device 14 with the switch 15 switches the fuel feed device on, for example, only if the fuel nozzle 10 is held at least in certain sections by the filler section 6 of the filler connector 5.

The switching device 14 also has, for example, an optional sensor 19 for determining an internal pressure $p_i$ in the fuel tank 2. The internal pressure $p_i$ of the fuel tank is determined essentially by the gas pressure of the vaporizing fuel. The sensor 19 preferably is arranged in the interior space 9 of the fuel tank 2. The sensor 19 may be embodied to close an electric contact if a predetermined pressure threshold value is reached, and to disconnect the electric contact if the predetermined pressure threshold value is undershot again. The sensor 19 is provided for interrupting or closing the electric contact of the line 17. The switching device 14 is embodied, for example, to switch on the fuel feed device only when the fuel nozzle 7 is held at least in certain sections by the filler section 6 of the filler connector 5 and when the internal pressure $p_i$ of the fuel tank determined by the sensor 19, is above the predetermined pressure threshold value.

The fuel tank 2 also has a venting device 20 for reducing an overpressure in the fuel tank 2. The venting device 20 is arranged, for example, in a cover region 21 of the fuel tank 2 and has a venting opening 22 in the cover region 21. The venting opening 22 is connected to a venting pipe 23 that functions to vent the fuel tank 2 into the surroundings. The venting pipe 23 has a pressure holding valve 24 for holding a minimum pressure in the fuel tank 2 and a filter device 25 for capturing volatile fuel components. The filter device 25, for example, is an activated carbon filter 25.

The fuel tank 2 preferably has a filling level limiting device 26 arranged in the cover region 21. The filling level limiting device 26 may comprise a filling level limiting valve 26 that closes the venting device 20 when the fuel tank 2 is filled completely with fuel. The filling level limiting device 26 has, for this purpose, for example a float 27 and a preferably plate-shaped valve body 28 that is coupled to the float 27. The float 27 is arranged, for example, in a valve cage 29 of the filling level limiting device 26. The valve cage 29 has openings so that fuel can enter the valve cage 29. The float 27 floats on the fuel and the valve body 28 closes the venting opening 22 of the venting device 20 when there is a sufficiently high fuel level 32 in the interior space 9 of the fuel tank 2.

A fuel pump 30 for feeding fuel to an internal combustion engine by means of a fuel line 31 preferably is provided in the interior space 9 of the fuel tank 2.

The method of functioning of the fuel tank without such a refueling device 1 is explained briefly below. The fuel flows from the fuel nozzle through the filler connector into the fuel tank. A gas pressure forms in the interior space of the fuel tank due to the vaporizing fuel and gives rise to an overpressure in the fuel tank. This overpressure normally is reduced via the venting device. However, the venting device offers a certain flow resistance due to the pressure holding valve and the filter device and in addition the pressure holding valve has a certain degree of inertia. Thus, the overpressure in the interior space of the fuel tank cannot be reduced quickly enough and the fuel tank internal pressure prevailing in the interior space of the fuel tank forces fuel back into the filler connector in the direction of the fuel nozzle. As soon as the fuel has backed up as far as the fuel nozzle, the latter switches off immediately. As a result, the refueling process is interrupted and has to be started anew.

The refueling device 1 of FIG. 1 avoids the above-described problem. The fuel nozzle 7 is introduced into the filler section 6 of the filler connector 5. The switching device 14 registers that the fuel nozzle 7 is held at least in certain sections by the filler section 6 and the fuel feed device 10 is switched on.

If the refueling device 1 has the optional sensor unit 19, the fuel feed device 10 is not switched on until the internal pressure $p_i$ of the fuel tank in the interior space 9 of the fuel tank 2 is above the predetermined pressure threshold value. The predetermined pressure threshold value is set so that the switching device 14 switches on the fuel feed device 10 before fuel is forced back into the filler connector 5. The fuel nozzle 7 feeds fuel into the filler connector 5, and the fuel feed device 10 feeds the fuel on from the filler connector 5 into the fuel tank 2 counter to the internal pressure $p_i$ prevailing in the fuel tank 2. As a result, the internal pressure $p_i$ prevailing in the fuel tank increases further, but is reduced gradually through the venting device 20.

Refueling therefore is possible independent of the internal pressure $p_i$ prevailing in the fuel tank 2. The refueling process is not interrupted prematurely by fuel that has been forced back into the filler connector 5. If the fuel level 32 in the interior space 9 of the fuel tank 2 rises until the filling level limiting device 26 closes the venting device 20, the fuel in the filler connector 5 accumulates as far as the fuel nozzle 7, and the fuel nozzle 7 switches off. The fuel nozzle 7 is removed from the filler section 6, and the switching device 14 again switches off the fuel feed device 10. The fuel tank internal pressure $p_i$ prevailing in the interior space 9 is reduced via the venting device 20.

Figure 2:
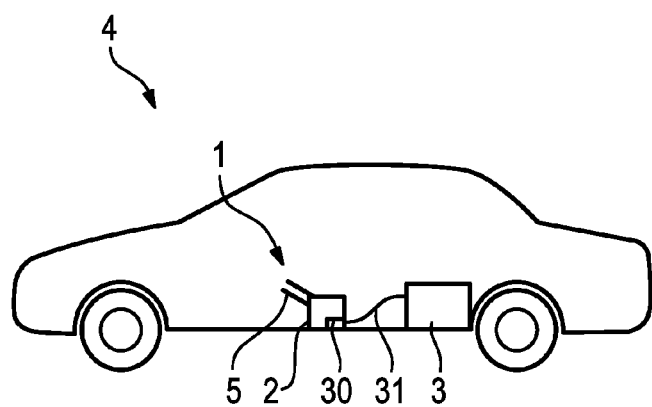
FIG. 2 is a schematic illustration of a motor vehicle having a refueling device according to FIG. 1.

FIG. 2 illustrates a motor vehicle 4 with an internal combustion engine 3 and a refueling device 1 of this type. The refueling device 1 functions to refuel the fuel tank 2 with fuel for the internal combustion engine 3.

What is claimed is:

1. A refueling device for refueling a fuel tank of an internal combustion engine of a motor vehicle, comprising:

a filler connector for feeding fuel to the fuel tank, the filler connector having an inlet end remote from the fuel tank and an outlet end lower than the inlet end and connected to the fuel tank;

a switch in the filler connector for sensing a presence of a fuel nozzle in the filler connector;

a pressure sensor in the fuel tank for measuring pressure in the fuel tank above a level of the fuel;

an electronic fuel pump integrated into the filler connector and being connected to the switching device and to the pressure sensor, the electronic fuel pump being configured for feeding the fuel from the filler connector to the fuel tank only when the switch senses the fuel nozzle in the filler connector and the pressure sensed by the pressure sensor is above a pre-determined threshold value, whereby the electronic fuel pump enables reliable and quick refueling of the fuel tank counter to a pressure in the fuel tank higher than the threshold level; and wherein the filler connector has essentially a cross-section of a hollow cylinder, and wherein the electronic fuel pump is arranged approximately centrally in the cross section of the filler connector.

2. The refueling device as claimed in claim 1, wherein the electronic fuel pump is integrated into the filler connector at a position adjacent the fuel tank.

3. The refueling device of claim 1, wherein a feed capacity of the electronic fuel pump exceeds a feed capacity of a fuel nozzle.

4. The refueling device of claim 1, wherein the switching device switches on the electronic fuel pump only when the fuel nozzle is held at least in certain sections by the filler section of the filler connector.

5. The refueling device of claim 1, wherein the electric fuel pump is a flow pump or a displacement pump.

6. The refueling device of claim 1, wherein the fuel tank and the filler connector are integral or unitary with one another.

7. The refueling device of claim 1, wherein the fuel tank has a venting device for reducing an overpressure in the fuel tank.

8. The refueling device of claim 7, further comprising a filling level limiting device in the fuel tank to close off the venting device when the fuel tank is filled completely with fuel.

9. A motor vehicle having a refueling device as claimed in claim 1.

\* \* \* \* \*